United States Patent
Engelhardt

(10) Patent No.: US 10,795,138 B2
(45) Date of Patent: Oct. 6, 2020

(54) FLUORESCENCE MICROSCOPE INSTRUMENT COMPRISING AN ACTIVELY SWITCHED BEAM PATH SEPARATOR

(71) Applicant: Deutsches Krebsforschungszentrum, Heidelberg (DE)

(72) Inventor: Johann Engelhardt, Bad Schoenborn (DE)

(73) Assignee: DEUTCHES KREBSFORSCHUNGSZENTRUM, Heidelberg (DE)

( * ) Notice: Subject to any disclaimer, the term of this patent is extended or adjusted under 35 U.S.C. 154(b) by 309 days.

(21) Appl. No.: 15/909,161

(22) Filed: Mar. 1, 2018

(65) Prior Publication Data
US 2018/0188516 A1    Jul. 5, 2018

Related U.S. Application Data

(63) Continuation of application No. PCT/EP2016/073928, filed on Oct. 6, 2016.

(30) Foreign Application Priority Data

Oct. 7, 2015  (EP) .................................... 15188708

(51) Int. Cl.
*G02B 21/00*  (2006.01)
*G02B 27/28*  (2006.01)
(Continued)

(52) U.S. Cl.
CPC ..... *G02B 21/0032* (2013.01); *G01N 21/6458* (2013.01); *G02B 21/0076* (2013.01); *G02B 27/283* (2013.01); *G02B 27/58* (2013.01)

(58) Field of Classification Search
CPC .. G02B 21/00; G02B 21/0004; G02B 21/002; G02B 21/0024; G02B 21/0036;
(Continued)

(56) References Cited

U.S. PATENT DOCUMENTS

| | | |
|---|---|---|
| 6,377,344 B2 | 4/2002 | Schoeppe |
| 6,510,001 B1 | 1/2003 | Engelhardt et al. |

(Continued)

FOREIGN PATENT DOCUMENTS

| | | |
|---|---|---|
| EP | 1396739 A1 | 7/2003 |
| EP | 1720052 A1 | 4/2006 |

(Continued)

OTHER PUBLICATIONS

International Search Report and Written Opinion in related, co-pending PCT Application No. PCT/EP2016/073928, dated Apr. 7, 2017.

*Primary Examiner* — Robert E. Tallman
(74) *Attorney, Agent, or Firm* — Thomas | Horstemeyer, LLP

(57) ABSTRACT

A fluorescence microscope instrument includes a light source; an objective focusing light from the light source into a sample and collecting fluorescence light emitted out of the sample; a detector detecting the fluorescence light; and a beam path separator arranged in a first beam path between the light source and the objective and in a second beam path between the objective and the detector. Wavelengths of the light to be directed to the sample and of the fluorescence light to be detected by the detector fall into an extended range of wavelengths. The beam path separator separates the two beam paths in that it is transferable between being transparent for any wavelength of the range of wavelengths and coming along the first beam path, and a second state in which it is transparent for any wavelength of the range of wavelengths and coming along the second beam path.

19 Claims, 3 Drawing Sheets

(51) Int. Cl.
*G01N 21/64* (2006.01)
*G02B 27/58* (2006.01)

(58) Field of Classification Search
CPC ............ G02B 21/0052; G02B 21/0056; G02B 21/006; G02B 21/0068; G02B 21/0076
See application file for complete search history.

(56) References Cited

U.S. PATENT DOCUMENTS

| | | |
|---|---|---|
| 6,654,165 B2 | 11/2003 | Engelhardt et al. |
| 6,781,763 B1 * | 8/2004 | Tamburino ......... G02B 27/1066 348/757 |
| 7,298,551 B2 | 11/2007 | Wolleschensky |
| 7,636,158 B1 * | 12/2009 | Pawluczyk ............... G01J 3/02 356/326 |
| 7,701,632 B2 | 4/2010 | Wolleschensky |
| 7,872,799 B2 * | 1/2011 | Wolleschensky ..... G01J 3/1256 359/386 |
| 9,476,832 B2 | 10/2016 | Walla et al. |
| 2003/0030901 A1 | 1/2003 | Prockop et al. |
| 2006/0256426 A1 | 11/2006 | Wolleschensky |
| 2008/0088907 A1 | 4/2008 | Wolleschensky |

FOREIGN PATENT DOCUMENTS

| | | |
|---|---|---|
| WO | 99/42884 A1 | 8/1999 |
| WO | 2013/083665 A1 | 6/2013 |

\* cited by examiner

FLUORESCENCE MICROSCOPE INSTRUMENT COMPRISING AN ACTIVELY SWITCHED BEAM PATH SEPARATOR

CROSS REFERENCE TO RELATED APPLICATIONS

This application is a continuation of International Application PCT/EP2016/073928 with an International Filing Date of Oct. 6, 2016 and claiming priority to European Patent Application No. 15 188 708.0 also entitled "Fluorescence Microscope Instrument comprising an actively switched Beam Path Separator", filed on Oct. 7, 2015.

FIELD OF THE DISCLOSURE

The present invention relates to a fluorescence microscope instrument comprising a light source, a detector, an objective and a beam path separator. The fluorescence microscope instrument may, for example, be a scanning microscope, a flow cytometer, or a micro spot measurement instrument.

More particularly, the present invention relates to a fluorescence microscope instrument in which light directed to a sample and fluorescence light emitted out of the sample are passing through a same objective in opposite directions. The fluorescence microscope instrument may be a high or super resolution fluorescence microscope instrument providing a spatial resolution surpassing the diffraction barrier. For example, it may be a so-called RESOLFT or STED scanning microscope.

BACKGROUND OF THE DISCLOSURE

WO 99/42884 A1 discloses confocal laser scanning microscopes. The starting point of this prior art document is a dichroic mirror separating the beam path of fluorescence light coming from a sample from the beam path of light coming from a light source and directed to the sample by means of different wavelengths. Actually, the fluorescence light is passing through the dichroic mirror undeflected, whereas the light coming from the light source is deflected towards the objective. WO 99/42884 A1 points out that the use of a dichroic mirror as a beam path selector has some drawbacks. Dichroitic mirrors are expensive. They have a certain wavelength characteristic and are thus not flexible with regard to the wavelength of the light directed to the sample and the fluorescence light emitted out of the sample. Replacing the dichroitic mirror with changes in wavelength requires readjusting the microscope. Further, there are losses in fluorescence light due to unwanted partial reflection of the fluorescence light, because the transmission and reflection wavelength areas of a dichroic mirror are overlapping. Thus, a dichroic mirror cannot be used for completely separating the fluorescence light from the beam path of the light directed to the sample. Further, the light directed to the sample is limited in wavelength, i.e. it is not possible to direct light of very different wavelengths via one dichroic mirror to the sample.

To avoid these drawbacks, WO 99/42884 A1 teaches to replace the dichroic mirror by a spectrally selective element which is suitable to stop or couple in light of different wavelengths. This spectrally selective element is used for coupling in the light directed to the sample on the one hand and for stopping fractions of this light reflected by the sample and to thus separate it from the fluorescence light emitted by the sample due to its wavelength on the other hand. The spectrally selective element may be adjustable to the wavelength of the light directed to the sample. Particularly, the spectrally selective element may be an active component, like for example an acousto-optical or electro-optical element such as an acousto-optical deflector (AOD) or an acousto-optical tunable filter (AOTF).

The spectrally selective element of the fluorescence microscope known from WO 99/42884 A1 also has drawbacks. It may be adjusted to different wavelengths of the light directed to the sample, but it does not work, if the light to be directed to the sample has a broader wavelength bandwidth.

U.S. Pat. No. 6,377,344 B2 discloses a fluorescence microscope comprising a device for the adjustable coupling of wavelengths or wavelength regions into an illumination beam path of the microscope. The device comprises at least one dispersive element for wavelength separation of the illumination light directed to the sample and at least one partially reflecting element in the wavelength-separated portion of the illumination light for reflecting back a wavelength region in the direction of the microscope illumination. This device is also used for adjustable detection of fluorescence light coming from the sample for the adjustable stopping down or cutting out at least one wavelength region and deflecting in the direction of at least one detector. The device known from U.S. Pat. No. 6,377,344 B2 has to be exactly adapted to the wavelengths involved with regard to the arrangement of the partially reflecting element arranged in the wavelength-separated portion of the illumination and object light.

WO 2013/083665 A1 discloses a fluorescence microscope in which detectors for detecting fluorescence light emitted by a sample are synchronized with a light source for light to be directed to the sample. The light source comprises a polarization element. The polarization element rotates a linear polarization direction of the light directed to the sample. The detectors are synchronized with this rotation of the polarization, and they are arranged behind a polarization beam splitter splitting the fluorescence light emitted out of the sample. The light source of the fluorescence microscope known from WO 2013/083665 A1 may also provide fluorescence inhibition light whose wavefronts are shaped in such a way that a light intensity distribution of the fluorescence inhibiting light comprises a zero point enclosed by high intensities of the fluorescence inhibition light in a focal area into which the light directed to the sample is focused.

A beam path separator of the microscope according to WO 2013/083665 A1 which is used to separate the beam path of the fluorescence light coming from the sample from the beam path of the light coming from the light source and directed to the sample is a common dichroic mirror. General background information is about such fluorescence instruments is found in the text book Handbook of Biological Confocal Microscopy, Third Edition, edited by James B. Pawley, 2006.

EP 1 720 052 A1 discloses a device for controlling light radiation, which is excited in a specimen or which is backscattered or deflected and which contains one or more wavelengths, at a plurality of light outlets. A separation of the light radiation into differently polarized components is carried out; and the components of the excitation or detection radiation are affected in their polarization by means of a preferably birefringent, preferably acousto-optic or electro-optic medium, which changes the ordinary and extraordinary refractive index. Particularly, the medium rotates the polarization of the radiation depending on its spectral composition so that it can be spatially separated into various outlets. Birefringent media with a specified or flexible polarization rotation can be used as the polarization-rotating elements. Elements with flexible adjustment options are acousto-optic elements, like an AOTF, or electro-optical elements, like a Pockels-cell. In a laser scanning microscope disclosed in EP 1 720 052 A1, an acoustic wave with adapted frequency and amplitude is applied to an AOTF such that a polarization beam splitter splits the excitation light in a linearized component directed to the objective of the microscope and a linearized component directed to a monitor diode. The light emitted from the sample is spectrally shifted in comparison to the excitation light. Therefore, the AOTF does not rotate the polarization, and both components of the light emitted by the sample and linearized by the polarization beam splitter reach one of two detectors, while the same acoustic wave is applied to the AOTF.

There still is a need of a fluorescence microscope instrument which may be easily adapted to varying wavelengths of the light directed to the sample and of the fluorescence light emitted out of the sample, and which also copes with a broader bandwidth of the light directed to the sample which, for example, is typical for high energy pulses of fluorescence inhibition light in STED microscopy.

SUMMARY

The present invention relates to a fluorescence microscope instrument comprising a light source configured to provide light to be directed to a sample; a detector configured to detect fluorescence light emitted out of the sample; an objective configured to focus the light from the light source into a focal area within the sample and to collect the fluorescence light emitted out of the focal area to be detected by the detector; and a beam path separator arranged in a first beam path of the light from the light source between the light source and the objective and in a second beam path of the fluorescence light between the objective and the detector, and separating the second beam path of the fluorescence light from the first beam path of the light from the light source. Wavelengths of the light to be directed to the sample and of the fluorescence light to be detected by the detector fall into a range of wavelengths extending from a low end wavelength over at least 20% of the low end wavelength. The beam path separator is configured to be transferred, within a sum of the travel time of the light of the light source from the beam path separator to the sample and the travel time of the fluorescence light from the sample to the beam path separator, between a first state in which the beam path separator is transparent by at least 75% for light of any wavelength falling into the range of wavelengths and coming along the first beam path of the light from the light source to the sample, and a second state in which the beam path separator is transparent by at least 75% for light of any wavelength falling into the range of wavelengths and coming along the second beam path of the fluorescence light from the sample to the detector.

The present invention also relates to a fluorescence microscope instrument comprising a light source configured to provide light to be directed to a sample; a detector configured to detect fluorescence light emitted out of the sample; an objective configured to focus the light from the light source into a focal area within the sample and to collect the fluorescence light emitted out of the focal area to be detected by the detector; and a beam path separator arranged in a first beam path of the light from the light source between the light source and the objective and in a second beam path of the fluorescence light between the objective and the detector, and separating the second beam path of the fluorescence light from the first beam path of the light from the light source. The beam path separator comprises two polarization beam splitters and a birefringent electro-optical element located between the two polarization beam splitters, the birefringent electro-optical element being selected from a Pockels-cell and a Kerr-cell. The beam path separator is configured to be transferred within a sum of the travel time of the light of the light source from the beam path separator to the sample and the travel time of the fluorescence light from the sample to the beam path separator between a first state in which the beam path separator is essentially transparent for light of any wavelength falling into a range of wavelengths and coming along the first beam path from the light source to the sample, and a second state in which the beam path separator is essentially transparent for light of any wavelength falling into the range of wavelengths and coming along the second beam path from the sample to the detector.

The present invention further relates to a fluorescence microscope instrument comprising a light source configured to provide light to be directed to a sample; a detector configured to detect fluorescence light emitted out of the sample; an objective configured to focus the light from the light source into a focal area within the sample and to collect the fluorescence light emitted out of the focal area to be detected by the detector; and a beam path separator arranged in a first beam path of the light from the light source between the light source and the objective and in a second beam path of the fluorescence light between the objective and the detector, and separating the second beam path of the fluorescence light from the first beam path of the light from the light source. The beam path separator comprises two 50:50 beam splitters, two optical paths extending between the two 50:50 beam splitters, and at least one optical path length varying element located in one of the two optical paths between the two 50:50 beam splitters. The at least one optical path length varying element is configured to vary the optical path length of the one of the optical paths to transfer the beam path separator, within a sum of the travel time of the light of the light source from the beam path separator to the sample and the travel time of the fluorescence light from the sample to the beam path separator, between a first state in which the beam path separator is essentially transparent for light of any wavelength falling into a range of wavelengths and coming along the first beam path from the light source to the sample, and a second state in which the beam path separator is essentially transparent for light of any wavelength falling into the range of wavelengths and coming along the second beam path from the sample to the detector.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
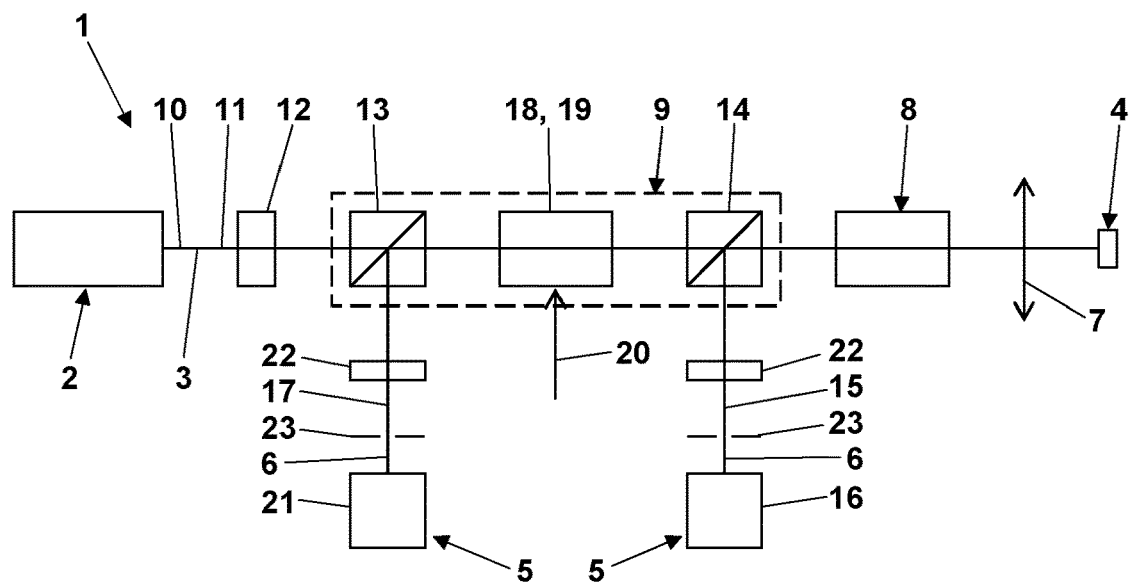
FIG. 1 illustrates a first embodiment of a scanning microscope according to the present invention comprising a first embodiment of a beam path separator.

A fluorescence microscope instrument according to the present invention comprises a light source providing light to be directed to a sample, a detector detecting fluorescence light emitted out of the sample, an objective focusing the light coming from the light source into a focal area within the sample and collecting the fluorescence light emitting out of the focal area to be detected by the detector, and a beam path separator arranged in the beam path of the light coming from the light source between the light source and the objective and in a beam path of the fluorescence light between the objective and the detector. Wavelengths of the light to be directed to the sample and of the light to be detected by the detector fall into a range of wavelengths extending from a low end wavelength towards longer wavelengths over at least 20% of the low end wavelength. The beam path separator separates the beam path of the fluorescence light coming from the sample from the beam path of the light coming from the light source in that it is transferable between a first state in which it is transparent by at least 75% for light of any wavelength falling in the range of wavelengths and coming along the beam path of the light of the light source and a second state in which it is transparent by at least 75% for light of any wavelength falling in the range of wavelengths and coming along the beam path of the fluorescence light from the sample.

The beam path separator of the fluorescence microscope instrument of the present invention is achromatic in that it is effective over the entire range of wavelengths extending from the low end wavelength over at least 20% of the low end wavelength. The low end wavelength is a design wavelength of the fluorescence microscope instrument of the present invention, i.e., together with the percentage of 20%, it defines the range of wavelengths for which the beam path separator is designed. Particularly the low end wavelength marks the lower end of this range of wavelengths. The separator is considered effective for light of any wavelength falling in this range of wavelengths when a loss of light intensity due to a non-perfect transition between its two states for the respective wavelengths is not more than 25%, preferably not more than 10%, and most preferably only a few percent. A loss of light intensity of not more than 10% is equal to the beam path separator, in its appropriate state, being transparent for the light from the light source and the fluorescence light from the sample by at least 90%. The low end wavelength may be equal to or shorter than a shortest wavelength of excitation light coming from the light source, which is used for exciting the emission of fluorescence out of the sample. The wavelengths of the fluorescence light and of all other light coming from the light source, like, for example, fluorescence inhibition light, are typically longer than the wavelength of the excitation light. Preferably, the range of wavelengths extends over at least 25% or even 30 of the low end wavelength from the low end wavelength. Then, the fluorescence light microscope according to the invention may be used over a particular big range of wavelengths of the excitation light, the fluorescence light and all other light passing through the beam path separator.

The light source may provide light of one or more wavelength(s) to be directed to the sample. If the light provided by the light source comprises components of different wavelengths, the wavefronts of these different components may be shaped differently. The detector may detect fluorescence light of a certain wavelength range only. For this purpose, it may be provided with a small bandwidth wavelength or color filter. The detector may also detect fluorescence light of two or more wavelengths separately. The objective or objective lens both focuses the light coming from the light source into the focal area within the sample and collects the fluorescence light emitted out of the focal area to be detected by the detector. The beam path separator operates essentially independently of the wavelengths of the light of the light source and the fluorescence light emitted out of the sample. For the purpose of nevertheless separating the beam path of the fluorescence light from the beam path of the light of the light source, it has two states. In the first state the beam path separator is transparent for the light coming from the light source, i.e. along the beam path from the light source to the objective. In its second state the beam path separator is transparent for the fluorescence light coming from the sample, i.e. along the beam path from the objective to the detector. Vice versa, in the first state of the beam path separator, light coming from the sample will not completely reach the detector, whereas, in the second state, light coming from the light source will not completely or even not at all reach the sample.

The fluorescence microscope instrument according to the present invention makes use of the fact that the light coming from the light source and having passed the beam path separator needs some time to get from there to the sample, and that the fluorescence light of interest emitted due to the irradiation of the sample with the light from then light source needs some additional time to get from the sample through the objective to the beam path separator. With a sufficiently quick transfer of the beam path separator between its first state and its second state in this meantime, the fluorescence light from the sample is thus completely forwarded to the detector.

The beam path separator, in its first state, may only be transparent as desired for light coming from the light source being linearly polarized in a fixed direction, whereas, in its second state, it is fully transparent for the fluorescence light from the sample independently of its polarization. The light coming from the light source may be laser light originally generated with a linear polarization. Then, it is no limitation that the beam path separator is only transparent as desired for the light coming from the light source if linearly polarized in the fixed direction. The fluorescence light from the sample, however, may have any polarization. Thus, it is important that the beam path separator, when in its second state, is transparent for the fluorescence light independently of its polarization.

Particularly, the beam path separator of the fluorescence microscope instrument according to the present invention is periodically transferred between its first state and its second state. For this purpose an electro-optical element of the beam path separator may be operated in a resonant mode to very quickly change its state between the first and second states in a defined way. For this purpose, the beam path separator may have a resonant or multi-resonant electrical driving circuit for the electro-optical element achieving transfer frequencies in the order of tens of MHz. The multi-resonant electrical driving circuit may exhibit multiple resonances for control signal shaping and manipulating the duty cycles. For details of a suitable multi-resonant electrical driving circuit see: J. Phinney et al.: Multi-resonant Microfabricated Inductors and Transformers, 35th Annual IEEE Power Electronics Specialists Conference Aachen, Germany, 2004.

In a particular embodiment, the beam path separator may comprise two polarization beam splitters of orthogonal or parallel forwarding polarization directions and a birefringent electro-optical element located between the two polarization beam splitters. The first polarization beam splitter, as seen from the light source, completely forwards or deflects the linearly polarized light coming from the light source to the birefringent electro-optical element. In the first state of the beam path separator, the light coming from the light source getting out of the birefringent electro-optical element is completely forwarded or deflected to the objective by means of the second polarization beam splitter. In the opposite direction of the fluorescence light coming from the sample, the second polarization beam splitter separates a first part of the fluorescence light from the beam path of the light coming from the light source by deflecting or forwarding it in another direction than towards the birefringent electro-optical element; and, in the second state of the beam path separator, the second part of the fluorescence light is separated from the beam path of the light coming from the light source by means of the first polarization beam splitter.

In at least one of the two states of the beam path separator, an electric signal is applied to the electro-optical element so that it rotates the linear polarization direction of the light passing through by 90° or 270°. In the other state of the beam path separator, no electric signal or an electric signal is applied to the electro-optical element so that it rotates the linear polarization direction of the light passing through by 0° or 180°. Thus, the linearly polarized light coming from the light source is getting through both polarization beam splitter to the objective, whereas the fluorescence light from the sample is separated from the beam path of the light coming from the light source in two steps at the second and the first beam splitter depending on its polarization direction.

The birefringent electro-optical element rotating the polarization direction differently in the first and second states of the beam path separator may, for example, be a Pockels-cell or a Kerr-cell. Particularly Pockels-cells suitable for the beam path separator are commercially available and may be controlled at a sufficiently high speed for transferring the beam path separator between its two states within the sum of the travel time of the light of the light source from the beam path separator to the sample and the travel time of the fluorescence light from the sample to the beam path separator.

The angle of rotation of the polarization of light by a single Pockels-cell or Kerr-cell linearly depends on the wavelength of the light. Thus, the described rotations of the polarization of the respective light will be achieved exactly at a certain wavelength only. If this certain wavelength, however, is the median wavelength of the range of wavelengths into which the wavelengths of all kinds of light passing through the beam path separator fall, the maximum error in polarization direction will only be a few degrees with a desired rotation by 90° and with the range of wavelengths of 20% of a lower end wavelength, for example. This will only result in a loss of light intensity of a few percent, at maximum, particularly as the loss of light intensity is not linearly dependent on the error of the angle of rotation but on the sine of the resulting difference to the desired angle of rotation of 90°.

The two parts or partial beams of the fluorescence light separately separated or diverted from the beam path of the light coming from the light source by the two polarization beam splitters may be recombined between the beam path separator i.e. its two polarization beam splitters, and the detector for the fluorescence light. They may, alternatively, be detected by two separate detector units of the detector.

In an alternative embodiment of the fluorescence microscope instrument according to the present invention, the beam path separator comprises two 50:50 beam splitters, and at least one optical path length varying element located in one of two optical paths extending between the two 50:50 beam splitters. It is also possible to have one or more optical path lengths varying element in each of the two optical paths extending between the two 50:50 beam splitters. Further, the beam path separator will include full mirrors recombining the two optical paths separated at the respective first 50:50 beam splitter at the respective second 50:50 beam splitter. This second 50:50 beam splitter has two potential outputs. At one of these outputs light coming along one of the optical paths and reflected by the second 50:50 beam splitter is to superimposed with light coming along the other optical path and transmitted by the second 50:50 beam splitter, whereas at the other output light coming along the one optical path and transmitted by the 50:50 beam splitter is superimposed with light along the other optical path and reflected by the second 50:50 beam splitter. Due to different phase shifts caused by the reflection and the transmission of the light by the second 50:50 beam splitter, the relative phases of the components of the light superimposed at the two outputs of the second 50:50 beam splitter are different. By means of the at least one optical path length varying element, the relative phase at one of the outputs may be adjusted to $\lambda/2$ or 180° resulting in a destructive interference of the two components so that no light intensity exits the 50:50 beam splitter at this output. Consequently, all the light intensity has to exit the 50:50 beam splitter at the other output. In the first state of the beam path separator, the optical path length varying element is adjusted such that the light coming from the light source exits the second 50:50 beam splitter, as seen from the light source, at that output pointing towards the objective. In the second state of the beam path separator, the optical path length varying element is adjusted such that the light from the sample exits the second 50:50 beam splitter, this time from the point of view of the objective, at the output pointing towards the detector, whereas the light intensity is zero at the output pointing towards the light source.

It will be understood that the optical path lengths of the two optical paths between the two 50:50 beam splitters have to be equal within the coherence length of the fluorescence light from the sample, i.e. within a few micrometer. Otherwise, it will not be possible to extinguish the extensity of the fluorescence light going back to the light source so that the intensity of the fluorescence light is fully directed towards the detector. A passive optical path length compensating element may be introduced into the second beam path in order to compensate for the average optical path length change caused by the optical path length varying element in the first beam path. The coherence length of the light source, particularly if the light source is a laser, will typically be not critical as it is typically much longer than the coherence length of fluorescence light.

The optical path length varying element may, for example, be an electro-optical phase modulator. Such a phase modulating device will exactly vary the optical path length as desired for a certain wavelength only. With wavelengths only deviating from this certain wavelength by 10%, for example, the resulting error in optical path length, however, will only amount to 10 of the desired variation in optical path length, and this error will only result in an even smaller loss in light intensity, similarly as in the case of the other particular embodiment of the invention discussed above.

For its ease of use without losing its internal adjustment, the beam path separator may be made as a monolithic unit which may include neutral optical elements arranged between the functional parts of the beam path separator. The neutral optical elements are selected such as to not influence the light passing therethrough to any relevant extend, i.e. such as to not affect the desired function of the beam path separator. The essential parts and the neutral optical elements will be cemented together by a suitable optical cement.

The light source may particularly include a pulsed light source, like for example a pulsed laser. The beam path separator may then be transferred out of its first state into its second state after or at the end of each of a plurality of light pulses from the pulsed light source. Preferably, the beam path separator is configured to be transferred out of its first state into its second state at the end of or after each light pulse of the pulses from the pulsed light source. This includes that the beam path separator is transferred back out of its second state into its first state prior to the next pulse from the pulsed light source. Particularly, the beam path separator of the fluorescence microscope instrument according to the present invention is periodically transferred between its first state and its second state in synchronization with the pulsed light source.

To reduce the speed at which the beam path separator has to be transferred between its first and second states, an optical delay including an optical fiber may be arranged between the beam path separator and the objective which prolongs the travel times of the light of the light source to the sample and of the fluorescence light emitted out of the sample to the beam path separator.

In the fluorescence light microscope instrument according to the present invention, the light source may provide fluorescence excitation light and fluorescence inhibition light of different wavelengths. Due to the achromatic beam path separator, neither different wavelengths nor a broader wavelength bandwidths of the fluorescence excitation light and the fluorescence inhibition light cause any problems.

The light source of the fluorescence microscope instrument according to the present invention may comprise a wavefront shaping device shaping wavefronts of the fluorescence inhibition light such as to form an intensity distribution of the fluorescence inhibition light comprising a zero point in the focal area within the sample. The fluorescence excitation light may also pass through this wavefront shaping device without affecting a local maximum of its intensity distribution in the focal area.

It may be required to interchange this wavefront shaping device with different wavelengths of the fluorescence excitation light and the fluorescence inhibition light. The wavefront shaping device, however, is no optical element changing the direction of the beam path so that interchanging it requires comparatively little effort. The same applies to a wavelength-selective filter which may be arranged in front of the detector to only detect fluorescence light of a certain wavelength by means of the detector. Such a wavelength-selective or color filter is particularly useful as the achromatic beam path separator forwards all light from the sample to the detector, i.e. independently of its wavelength. Thus, the light getting from the beam path separator towards the detector also includes other light components besides the fluorescence light of interest.

The light source of the fluorescence microscope instrument according to the present invention may generate a plurality of wavelengths or even a continuum of wavelengths from which at least one of the wavelengths of the fluorescence excitation light and the fluorescence inhibition light is selected.

If the fluorescence light microscope instrument according to the present invention is a scanning microscope, it comprises a scanner moving the focal area in which the sample is measured with regard to the sample. The scanner may move the sample with regard to the objective. Often, however, the scanner will include a light deflecting element arranged between the beam path separator and the objective or within the objective to shift the focal area within the sample.

If the fluorescence light microscope instrument according to the present invention is a flow cytometer, the object measured is a sample flow. Further, a flow cytometer and other micro spot measurement instruments according to the present invention will have no scanner.

Referring now in greater detail to the drawings, the scanning microscope 1 schematically depicted in FIG. 1 comprises a light source 2 providing light 3 to be directed to a sample 4, a detector 5 detecting fluorescence light 6 emitted out of the sample 4, an objective 7, a scanner 8 and a beam path separator 9. The objective 7 focuses the light 3 into a focal area within the sample 4. Further, the objective 7 focuses the fluorescence light 6 emitted out of the focal area within the sample 4 onto the detector 5. The scanner 8 moves the focal area with regard to the sample 4 to scan the sample 4 with the focal area. The beam path separator 9 separates a beam path of the fluorescence light 6 coming from the sample 4 from a beam path of the light 3 coming from the light source 2. This light 3 coming from the light source 2 has two components, i.e. fluorescence excitation light 10 and fluorescence inhibition light 11 of different wavelengths. Both the fluorescence excitation light 10 and the fluorescence inhibition light 11 pass through a wavefront shaping device 12 which leaves the wavefronts of the fluorescence excitation light 10 unaffected so that the fluorescence excitation light 10, when focused by the objective 7, has a local intensity maximum in the center of the focal area. The wavefronts of the fluorescence inhibition light 11, however, are shaped or deformed such that the intensity distribution of the fluorescence inhibition light focused by the objective 7 has a zero point in the center of the focal area within the sample 4 which is surrounded by high light intensities of the fluorescence inhibition light 11. Thus, the fluorescence inhibition light, which may, for example, be STED light or a switch-off light, reduces the parts of the focal area out of which fluorescence light may be emitted from the sample 4. Both the fluorescence excitation light 10 and the fluorescence inhibition light 11 are linearly polarized in such a way that they are passing through two polarization beam splitters 13 and 14 of the beam path separator 9 undeflected. The fluorescence light 6 from the sample 4 has not particular polarization. A first partial beam 15 of the fluorescence light 6 from the sample 4 is deflected by the polarization beam splitter 14 towards a first detector unit 16 of the detector 5. The polarization direction of the other partial beam 17 of the fluorescence light 6 is rotated by 90° when passing through a birefringent electro-optical element 18 of the beam path separator 9. The electro-optical element 18 which may, for example, be a Pockels-cell 19 has not been active at that time at which the light 3 from the light source 2 was passing towards the sample 4 but has now been activated by an electrical control signal 20. Thus, the other partial beam 17 of the fluorescence light 6 is deflected by the polarization beam splitter 13 towards another detector unit 21 of the detector 5. Together, the two detector units 16 and 21 register the total fluorescence light 6 collected by the objective 7. Dependent on its polarization, the fluorescence light 6 gets into the detector unit 16 or the detector unit 21. Particularly, the light 3 from the light source 2 is provided in pulses. During each of the pulses the birefringent electro-optical element 18 is not activated, but directly afterwards it is activated so that the fluorescence light 6 coming from the sample 4 is diverted towards the detector 5. Small bandwidth wavelength filters 22 placed in front of the detectors units 16 and 21 separate the fluorescence light 6 of interest from light 3 reflected by the sample 4. Pinholes 23 in front of the detector units 16 and 21 may provide for a confocal arrangement of the detectors 16 and 21 with regard to the focal area in the sample 4. Differences between output signals of the detector units 16 and 21 may, for example, be evaluated for a distribution of dipole orientations of fluorescent molecules within the sample 4.

Figure 2:
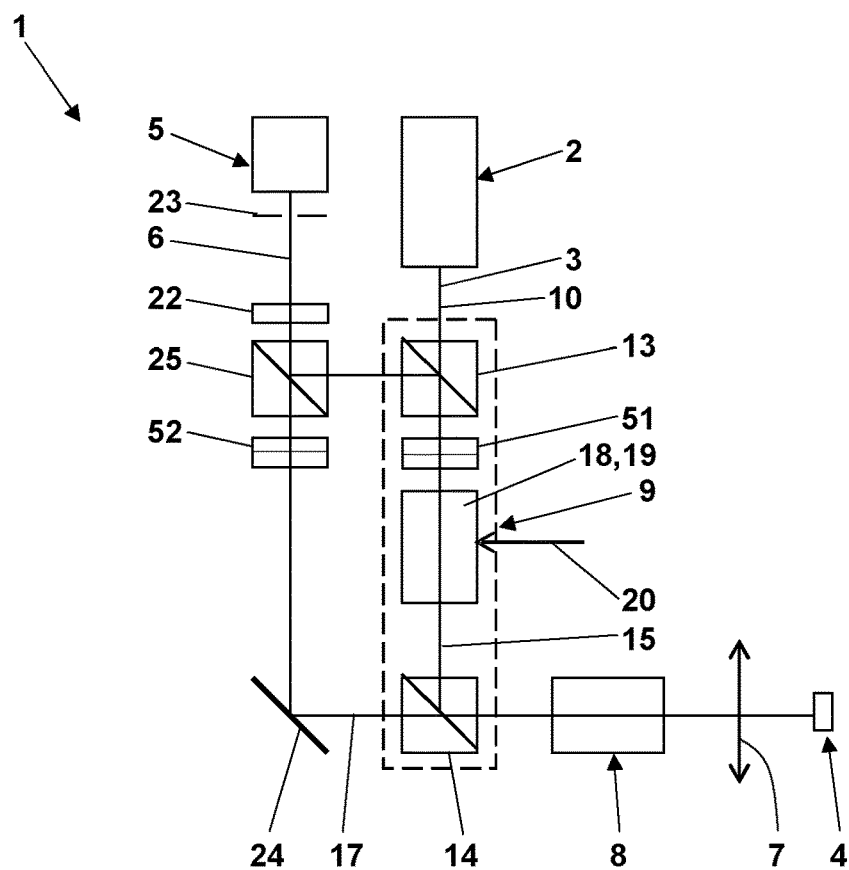
FIG. 2 illustrates a second embodiment of the scanning microscope according to the present invention comprising a second embodiment of the beam path separator.

The embodiment of the scanning microscope 1 according to FIG. 2 differs from that one in FIG. 1 with regard to the following details. The light 3 from the light source 2 only consists of fluorescence excitation light 10 here. The light 3 once again passes through polarization beam splitter 13 undeflected but due to a λ/2 plate 51 is deflected by polarization beam splitter 14. When the fluorescence light 6 from the sample 4 is passing, the birefringent electro-optical element 18 is active, and the two partial beams 17 and 15 of the fluorescence light 6 are diverted from the beam path of the light 3 coming from the light source 2 by means of the polarization beam splitters 14 and 13, respectively. Further, the two parts 17 and 15 of the fluorescence light 6 are recombined by means of a full mirror 24, an optional further λ/2 plate 52 and an additional polarization beam splitter 25 arranged between the polarization beam splitters 14 and 13 of the beam path separator 9 and the detector 5. Despite the birefringent electro-optical element 18 in the beam path of the partial beam 15, the beam paths of both partial beams 17 and 15 correspond to each other and they are essentially of a same length so that they essentially reach the detector 5 at a same time.

Figure 3:
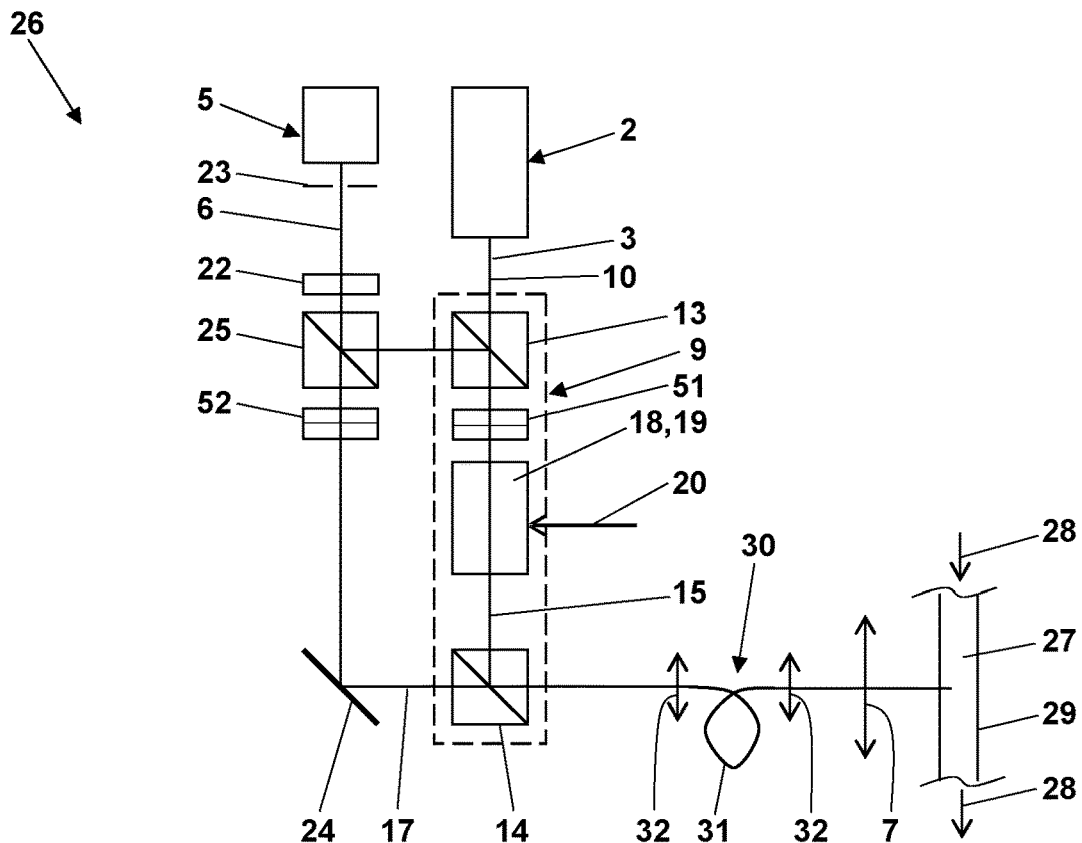
FIG. 3 illustrates an embodiment of a flow cytometer according to the present invention also comprising the second embodiment of the beam path separator.

The flow cytometer 26 depicted in FIG. 3 is similar to the scanning microscope 1 according to FIG. 2. The main difference is that the scanner 8 according to FIG. 2 is missing. Instead, the objective 7 focuses the light 3 from the light source 2 in a focal area within a sample flow 27. The movement of the sample flow 27 in direction of arrows 28 through a sample tube 29 provides the relative movement between the focal area and the sample flow 27 instead of the scanner 8. Further, FIG. 3 schematically depicts an optical delay 30 consisting of a single mode fiber 31 and lenses 32 between the beam path separator 18 and the objective 7. This optical delay 30 increases the travel time of the light 3 towards the sample flow 27 and the travel time of the fluorescence light 6 from the sample flow 27 to the beam path separator 9 so that there is more time for transferring the beam path separator 9 from its one state with activated birefringent electro-optical element 9 to its other state with inactivated birefringent optical element 18.

Figure 4:
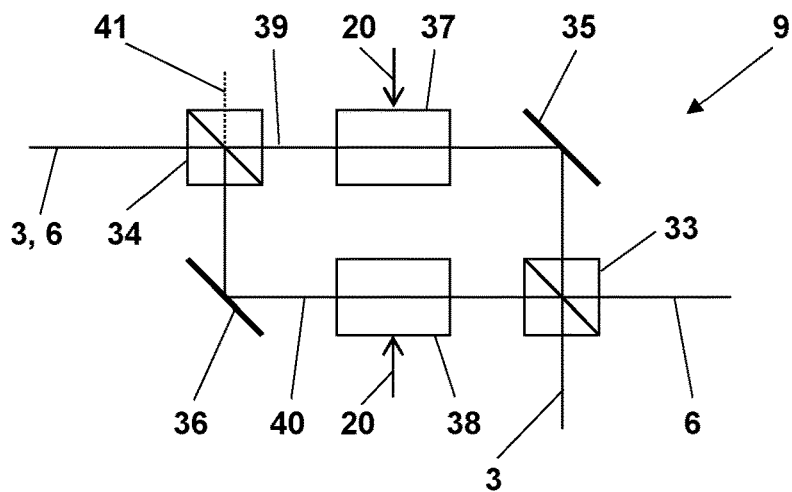
FIG. 4 illustrates a further embodiment of the beam path separator.

FIG. 4 shows a further embodiment of the beam path separator 9 which may, for example, be used in the scanning microscope 1 according to FIG. 2 or the flow cytometer 26 according to FIG. 3. Here, the beam path separator 9 comprises two 50:50 beam splitters 33 and 34, two full mirrors 35 and 36 and two electro-optical phase modulators 37 and 38. For example, the light source, not depicted here, may be connected to the lower end of the 50:50 beam splitter 33, and the detector also not depicted here may be connected to the right hand side of the 50:50 beam splitter 33, whereas the objective also not depicted here is connected to the left hand side of the 50:50 beam splitter 34.

Between the two 50:50 beam splitters 33 and 34 the beam paths of the light 3 from the light source and of the fluorescence light 6 from the sample are split up into two optical paths 39 and 40. Particularly, the light 3 from the light source is split up by the 50:50 beam splitter 33 and recombined by the following 50:50 beam splitter 34, whereas the fluorescence light 6 from the sample is split up by the 50:50 beam splitter 34 and recombined by the following 50:50 beam splitter 33. The optical paths 39 and 40 have same optical lengths. A difference in the optical path lengths of the optical paths 39 and 40 is smaller than a coherence length of the fluorescence light 6. The phase modulators 37 and 38 are used to adjust the relative length of the optical paths 39 and 40 such that light entering the beam path separator 9 at one of the 50:50 beam splitters 33 and 34 exits the following 50:50 beam splitter 34 or 33 in one selected direction only. In the other direction, a destructive interference of the parts of the light which proceed along the two optical paths 39 and 40 and which are recombined at the following 50:50 beam splitter 34 or 33 is adjusted.

In the first state of the beam path separator 9, the phase modulators 37 and 38 are controlled by the electrical control signals 20 to adjust the optical path length of the optical paths 39 and 40 such that the 50:50 beam splitter 34 outputs the entire light intensity of the light 3 from the light source towards the objective, whereas, due to destructive interference, no light intensity is output in the other output direction 41 of the 50:50 beam splitter 34. In the second state of the beam path separator 9, the path lengths of the optical beam paths 39 and 40 are adjusted by controlling the phase modulators 37 and 38 with the electrical control signals 20 such that the fluorescence light 6 collected by the objective is only forwarded towards the detector, whereas, due to destructive interference, the light intensity of the fluorescence light 6 output by the 50:50 beam splitter 33 in the direction of the previously incoming light 3 is the zero.

Figure 5:
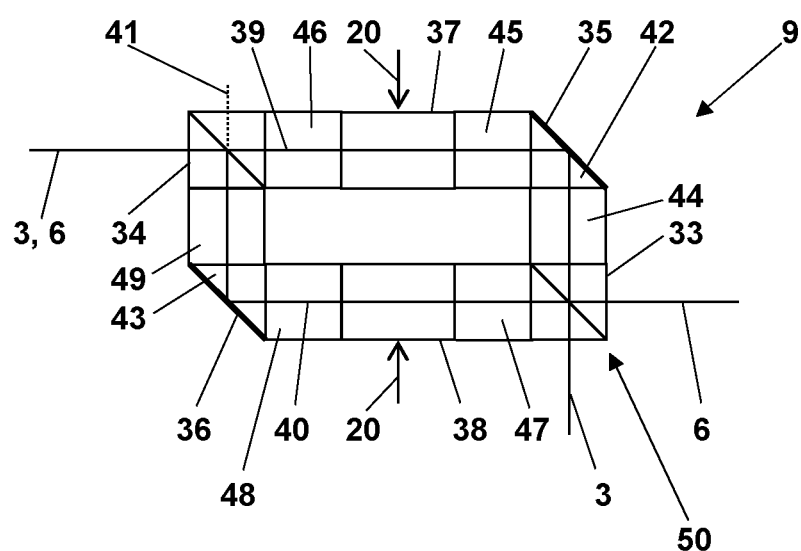
FIG. 5 illustrates a monolithic variant of the embodiment of the beam path separator of FIG. 4.

In the monolithic variant of the beam path separator 9 according to FIG. 4 depicted in FIG. 5, the full mirrors 35 and 36 are provided by reflection coated prisms 42 and 43, respectively, and the 50:50 beam splitters 33 and 34, the phase modulators 37 and 38, and the prisms 42 and 43 are fixed, i.e. cemented to each other with neutral optical elements 44 to 49 arranged in between to form one monolithic unit 50. Once correctly assembled, the monolithic units 50 ensure equal optical path lengths of the optical paths 39 and 40 and a correct alignment and adjustment of all parts of the beam path separator 9. Some or even all of the neutral optical elements 44 to 49 may be omitted by directly cementing the neighboring parts of the beam path separator 9 to each other. The other embodiments of the beam path separator 9 described here may also be made as monolithic units including neutral optical elements.

Many variations and modifications may be made to the embodiments of the disclosure without departing substantially from the spirit and principles of the disclosure. All such modifications and variations are intended to be included herein within the scope of the present disclosure, as defined by the following claims.

I claim:

1. A fluorescence microscope instrument comprising:
a pulsed light source configured to provide light to be directed to a sample;
a detector configured to detect fluorescence light emitted out of the sample;
an objective configured to focus the light from the light source into a focal area within the sample and to collect the fluorescence light emitted out of the focal area to be detected by the detector; and
a beam path separator
arranged in a first beam path of the light from the light source between the light source and the objective and in a second beam path of the fluorescence light between the objective and the detector, and
separating the second beam path of the fluorescence light from the first beam path of the light from the light source,
wherein wavelengths of the light to be directed to the sample and of the fluorescence light to be detected by the detector fall into a range of wavelengths extending from a low end wavelength up to an upper wavelength which is at least 120% of the low end wavelength,
wherein the beam path separator is configured to be transferred, within a sum of the travel time of the light of the light source from the beam path separator to the sample and the travel time of the fluorescence light from the sample to the beam path separator, between
a first state in which the beam path separator is transparent by at least 75% for light of any wavelength falling into the range of wavelengths and coming along the first beam path of the light from the light source to the sample, and
a second state in which the beam path separator is transparent by at least 75% for light of any wavelength falling into the range of wavelengths and coming along the second beam path of the fluorescence light from the sample to the detector, and
wherein the beam path separator is configured to be transferred out of its first state into its second state after each light pulse of a plurality of light pulses from the pulsed light source.

2. The fluorescence microscope instrument of claim 1, wherein the beam path separator is configured to be periodically transferred between its first state and its second state.

3. The fluorescence microscope instrument of claim 2, wherein an electrical driving circuit of the beam path separator is a resonant electrical circuit having at least one resonance frequency.

4. The fluorescence microscope instrument of claim 1, wherein the beam path separator comprises two polarization beam splitters and a birefringent electro-optical element located between the two polarization beam splitters.

5. The fluorescence microscope instrument of claim 4, wherein the birefringent electro-optical element is selected from a Pockels-cell and a Kerr-cell.

6. The fluorescence microscope instrument of claim 4, wherein partial beams of the fluorescence light separately diverted from the first beam path of the light from the light source by the two polarization beam splitters are recombined between the beam path separator and the detector.

7. The fluorescence microscope instrument of claim 1, wherein the beam path separator comprises two 50:50 beam splitters, two optical paths extending between the two 50:50 beam splitters, and
at least one optical path length varying element located in one of the two optical paths between the two 50:50 beam splitters,
wherein the at least one optical path length varying element is configured to vary the optical path length of the one of the two optical paths to transfer the beam path separator between its first state and its second state.

8. The fluorescence microscope instrument of claim 7, wherein the at least one optical path length varying element is an electro-optical phase modulator.

9. The fluorescence microscope instrument of claim 1, wherein the beam path separator is made as a monolithic unit.

10. The fluorescence microscope instrument of claim 1, wherein the monolithic unit includes neutral optical elements that do not influence the light passing therethrough.

11. The fluorescence microscope instrument of claim 1, wherein an optical delay including an optical fiber is arranged between the beam path separator and the objective.

12. A fluorescence microscope instrument comprising:
a light source configured to provide light to be directed to a sample;
a detector configured to detect fluorescence light emitted out of the sample;
an objective configured to focus the light from the light source into a focal area within the sample and to collect the fluorescence light emitted out of the focal area to be detected by the detector; and
a beam path separator
arranged in a first beam path of the light from the light source between the light source and the objective and in a second beam path of the fluorescence light between the objective and the detector, and
separating the second beam path of the fluorescence light from the first beam path of the light from the light source,
wherein wavelengths of the light to be directed to the sample and of the fluorescence light to be detected by the detector fall into a range of wavelengths extending from a low end wavelength up to an upper wavelength which is at least 120% of the low end wavelength,
wherein the beam path separator is configured to be transferred, within a sum of the travel time of the light of the light source from the beam path separator to the sample and the travel time of the fluorescence light from the sample to the beam path separator, between
a first state in which the beam path separator is transparent by at least 75% for light of any wavelength falling into the range of wavelengths and coming along the first beam path of the light from the light source to the sample, and
a second state in which the beam path separator is transparent by at least 75% for light of any wavelength falling into the range of wavelengths and coming along the second beam path of the fluorescence light from the sample to the detector,
wherein the light source provides fluorescence excitation light and fluorescence inhibition light of different wavelengths, wherein the light source comprises a wave front shaping device shaping wavefronts of the fluorescence inhibition light such as to form an intensity distribution of the fluorescence inhibition light comprising a zero point in the focal area, and wherein the intensity distribution of the excitation light comprising a local maximum at the zero point of the intensity distribution of the fluorescence inhibition light in the focal area.

13. The fluorescence microscope instrument of claim 12, wherein the fluorescence excitation light also passes through the wave front shaping device.

14. The fluorescence microscope instrument of claim 12, wherein the wavefront shaping device is interchangeable or wherein an interchangeable wavelength filter is arranged between the beam path separator and the detector.

15. The fluorescence microscope instrument of claim 1, wherein the beam path separator, in its first state, is transparent for the light of any wavelength falling into the range of wavelengths and coming along the first beam path of the light from the light source by at least 90%, and, in its second state, is transparent for the light of any wavelength falling into the range of wavelengths and coming along second the beam path of the fluorescence light from the sample by at least 90%.

16. The fluorescence microscope instrument of claim 1, wherein the beam path separator, in its first state, is transparent for the light coming along the first beam path of the light from the light source if linearly polarized in a fixed direction, and, in its second state, is transparent for the light coming along the second beam path of the fluorescence light from the sample independently of its polarization.

17. The fluorescence microscope instrument of claim 1, wherein the fluorescence microscope instrument is
   a scanning microscope comprising a scanner moving the focal area with regard to the sample; or
   a flow cytometer, wherein the sample is a sample flow.

18. A fluorescence microscope instrument comprising:
   a pulsed light source configured to provide light to be directed to a sample;
   a detector configured to detect fluorescence light emitted out of the sample;
   an objective configured to focus the light from the light source into a focal area within the sample and to collect the fluorescence light emitted out of the focal area to be detected by the detector; and
   a beam path separator
      arranged in a first beam path of the light from the light source between the light source and the objective and in a second beam path of the fluorescence light between the objective and the detector, and
      separating the second beam path of the fluorescence light from the first beam path of the light from the light source,
   wherein the beam path separator comprises two polarization beam splitters and a birefringent electro-optical element located between the two polarization beam splitters, the birefringent electro-optical element being selected from a Pockels-cell and a Kerr-cell;
   wherein the beam path separator is configured to be transferred within a sum of the travel time of the light of the light source from the beam path separator to the sample and the travel time of the fluorescence light from the sample to the beam path separator between
      a first state in which the beam path separator is essentially transparent for light of any wavelength falling into a range of wavelengths and coming along the first beam path from the light source to the sample, and
      a second state in which the beam path separator is essentially transparent for light of any wavelength falling into the range of wavelengths and coming along the second beam path from the sample to the detector, and
   wherein the beam path separator is configured to be transferred out of its first state into its second state after each light pulse of a plurality of light pulses from the pulsed light source.

19. A fluorescence microscope instrument comprising:
   a pulsed light source configured to provide light to be directed to a sample;
   a detector configured to detect fluorescence light emitted out of the sample;
   an objective configured to focus the light from the light source into a focal area within the sample and to collect the fluorescence light emitted out of the focal area to be detected by the detector; and
   a beam path separator
      arranged in a first beam path of the light from the light source between the light source and the objective and in a second beam path of the fluorescence light between the objective and the detector, and
      separating the second beam path of the fluorescence light from the first beam path of the light from the light source,
   wherein the beam path separator comprises
      two 50:50 beam splitters, two optical paths extending between the two 50:50 beam splitters, and
      at least one optical path length varying element located in one of the two optical paths between the two 50:50 beam splitters,
   wherein the at least one optical path length varying element is configured to vary the optical path length of the one of the two optical paths to transfer the beam path separator, within a sum of the travel time of the light of the light source from the beam path separator to the sample and the travel time of the fluorescence light from the sample to the beam path separator, between
      a first state in which the beam path separator is essentially transparent for light of any wavelength falling into a range of wavelengths and coming along the first beam path from the light source to the sample, and
      a second state in which the beam path separator is essentially transparent for light of any wavelength falling into the range of wavelengths and coming along the second beam path from the sample to the detector, and
   wherein the beam path separator is configured to be transferred out of its first state into its second state after each light pulse of a plurality of light pulses from the pulsed light source.

* * * * *